United States Patent [19]

Schirmer

[11] Patent Number: 5,456,979
[45] Date of Patent: Oct. 10, 1995

[54] BIAXIALLY ORIENTED FILM

[75] Inventor: Henry G. Schirmer, Spartanburg, S.C.

[73] Assignee: W. R. Grace & Co.-Conn., Duncan, S.C.

[21] Appl. No.: 161,007

[22] Filed: Dec. 2, 1993

Related U.S. Application Data

[62] Division of Ser. No. 989,965, Dec. 11, 1992, Pat. No. 5,298,202, which is a continuation of Ser. No. 643,591, Jan. 18, 1991, abandoned, which is a continuation-in-part of Ser. No. 494,699, Mar. 16, 1990, abandoned, which is a continuation-in-part of Ser. No. 387,056, Jul. 28, 1989, abandoned.

[51] Int. Cl.$^6$ ................................................. B32B 27/08
[52] U.S. Cl. ........................ 428/336; 428/516; 428/910; 428/36.6
[58] Field of Search ........................ 428/336, 516, 428/910, 36.6

[56] References Cited

U.S. PATENT DOCUMENTS

| | | | |
|---|---|---|---|
| 3,355,531 | 11/1967 | Barnhart | 264/95 |
| 3,456,044 | 7/1969 | Pahlke | 264/25 |
| 3,551,540 | 12/1970 | Pellicciari et al. | 264/89 |
| 3,555,604 | 1/1971 | Pahlke | 18/14 |
| 3,576,658 | 4/1971 | Notomi | 117/7 |
| 3,661,482 | 5/1972 | Brown, Jr. | 425/66 |
| 3,894,907 | 7/1975 | Sudo | 156/494 |
| 3,932,563 | 1/1976 | Argurio et al. | 260/897 |
| 4,048,378 | 9/1977 | Peizek | 428/483 |
| 4,066,811 | 1/1978 | Hino et al. | 428/220 |
| 4,073,782 | 2/1978 | Kishi et al. | 260/23 |
| 4,333,968 | 6/1982 | Nahmias | 427/173 |
| 4,354,997 | 10/1982 | Mizutani et al. | 264/560 |
| 4,367,256 | 1/1983 | Biel | 428/218 |
| 4,389,450 | 6/1983 | Schaefer et al. | 428/212 |
| 4,390,587 | 6/1983 | Yoshimura et al. | 428/215 |
| 4,399,181 | 8/1983 | Yoshimura et al. | 428/213 |
| 4,421,823 | 12/1983 | Theisen et al. | 428/349 |
| 4,425,268 | 1/1984 | Cooper | 524/110 |
| 4,484,971 | 11/1984 | Wang | 156/244 |
| 4,501,634 | 2/1985 | Yoshimura et al. | 156/244 |
| 4,524,099 | 6/1985 | De Luccio | 428/213 |
| 4,588,650 | 5/1986 | Mientus et al. | 428/516 |
| 4,608,286 | 8/1986 | Motoishi et al. | 428/35 |
| 4,619,859 | 10/1986 | Yoshimura et al. | 428/213 |
| 4,626,455 | 12/1986 | Karabedian | 428/35 |
| 4,652,490 | 3/1987 | Arita et al. | 428/347 |

(List continued on next page.)

FOREIGN PATENT DOCUMENTS

| | | |
|---|---|---|
| 0292894 | of 0000 | European Pat. Off. |
| 0221726 | of 0000 | European Pat. Off. |
| 0092318 | 10/1983 | European Pat. Off. |
| 0298700 | 1/1989 | European Pat. Off. |
| 0321957 | 6/1989 | European Pat. Off. |
| 0333508 | 9/1989 | European Pat. Off. |
| 0319401 | of 0000 | France . |
| 0120339 | of 0000 | Japan . |
| 0054736 | of 0000 | Japan . |
| 0041550 | of 0000 | Japan . |
| 0922084 | of 0000 | United Kingdom . |
| 1181394 | of 0000 | United Kingdom . |
| 2123747 | 2/1984 | United Kingdom . |

*Primary Examiner*—Edith Buffalow
*Attorney, Agent, or Firm*—Mark B. Quatt

[57] ABSTRACT

Polymeric, thin oriented films can be made by use of a combination of a hot blown process and a blown bubble process, i.e. a double bubble process. The resulting film has use in replacing PVC for in store stretch wrap applications. Very low density polyethylene, VLDPE, is an especially preferred material for this process. It may be used as a monolayer, or as one layer of a multilayer structure. In practicing the invention, the polymer is extruded and hot blown, and heated to a temperature above its orientation temperature. This heating can be accomplished by the use of a heated liquid reservoir or sock disposed at the lower end of the primary bubble, inside the bubble. The hot blown heated film is then passed through a first set of pinch rolls, re-inflated into a blown bubble, and collapsed at a second set of pinch rolls. Thin, tough and elastic packaging materials are obtained by this process.

6 Claims, 2 Drawing Sheets

U.S. PATENT DOCUMENTS

| | | | |
|---|---|---|---|
| 4,657,982 | 4/1987 | Breck et al. | 525/240 |
| 4,671,987 | 6/1987 | Knott, II et al. | 428/216 |
| 4,713,282 | 12/1987 | Yazaki et al. | 428/216 |
| 4,778,699 | 10/1988 | Knox, III et al. | 428/35 |
| 4,820,557 | 4/1989 | Warren | 428/349 |
| 4,820,589 | 4/1989 | Debraski et al. | 428/422 |
| 4,835,218 | 5/1989 | Yoshimura et al. | 525/98 |
| 4,837,084 | 6/1989 | Warren | 428/349 |
| 4,840,823 | 6/1989 | Chigami et al. | 428/355 |
| 4,851,272 | 7/1989 | Knox, III | 428/352 |
| 4,863,769 | 9/1989 | Lustig et al. | 428/349 |
| 4,923,722 | 5/1990 | Kondo et al. | 428/349 |
| 4,923,750 | 5/1990 | Jones | 428/349 |
| 5,298,202 | 10/1992 | Schirmer | 428/336 |

BIAXIALLY ORIENTED FILM

This is a Divisional Application of application Ser. No. 989,965, filed on Dec. 11, 1992, now Pat. No. 5,298,202 which is, a Continuation of application Ser. No. 643,591, filed Jan. 18, 1991, now abandoned, which is a Continuation-In-Part of U.S. Ser. No. 494,699, filed Mar. 16, 1990, now abandoned, which is a Continuation-In-Part of U.S. Ser. No. 387,056, filed Jul. 28, 1989, now abandoned.

BACKGROUND OF THE INVENTION

The present invention pertains to packaging film, and more particularly to a thin polymeric film suitable for replacing polyvinyl chloride film especially in packaging applications.

Polyvinyl chloride (PVC) has long been used in many applications in the packaging art. One particularly widespread application for PVC is the use of such material as an overwrap material for trayed retail cuts of meat and other food products in a retail environment.

PVC has several desirable properties for this use. For example, it has excellent optics and good elasticity and stretch properties at use temperatures.

Unfortunately, PVC also has several disadvantages, including the production of hydrogen chloride gas during heat sealing and the generally corrosive effects of such gases in the packaging room.

It would be of great benefit to the packaging industry, and particular to applications requiring an instore film for overwrapping trayed food products, to provide a film with many of the advantages of PVC but without the disadvantages described above.

Applicant has discovered that a relatively thin polymeric film, preferably a polyolefin, and more preferably very low density polyethylene (VLDPE), produced by hot blowing and then stretch orienting the extruded film, exhibits excellent elasticity, toughness, stretch and optical properties.

The U.S. Pat. No. 3,456,044 (Pahlke) mentions thin films of thicknesses less than 1 mil such as 0.5 mils, and discloses a double bubble method for biaxially orienting thermoplastic films including the steps of producing a primary tubing which is inflated by introducing air into the interior thereof, and a cooling ring 22, as well as squeeze rolls 34 and 28, with rolls 34 having a greater speed than rolls 28. Between the two pairs of squeeze rolls is a reinflated secondary bubble. If annealing is desired, the tubing can be reinflated to form a bubble 70.

U.S. Pat. No. 3,555,604 (Pahlke) is a patent based on a divisional application which was derived from the same priority application as the '044 patent described above, and discloses the same information described above for the '044 patent.

SUMMARY OF THE INVENTION

In one aspect of the present invention, a method of making a thin, oriented polymeric film comprises extruding the polymer as a melt stream through a tubular die; hot blowing the extruded film; heating the hot blown film to a temperature above its orientation temperature; directing the heated film through a first set of pinch rolls; reinflating the hot blown film by a blown bubble process; and collapsing the reinflated film through a second set of pinch rolls.

In another aspect of the invention, a thin, oriented polymeric film useful as a packaging film is made by the steps of extruding the polymer as a melt stream through a tubular die; hot blowing the extruded film; heating the hot blown film to a temperature above its orientation temperature; directing the heated film through a first set of pinch rolls; reinflating the hot blown film by a blown bubble process; and collapsing the reinflated film through a second set of pinch rolls.

In still another aspect of the invention, a thin oriented packaging film comprises a layer of very low density polyethylene, the film having a thickness of less than about 1 mil.

In yet another aspect of the invention, an apparatus for making thin, oriented polymeric film comprises means for extruding the polymer as a melt stream through a tubular die; means for hot blowing the extruded film to form a primary bubble; means for heating the hot blown film to a temperature above its orientation temperature; a first set of pinch rolls through which the heated film is directed; a second set of pinch rolls by means of which the heated film, after reinflation by a blown bubble process, is collapsed; and means for circulating a heated liquid to and from a reservoir disposed at the lower end of the primary bubble.

DEFINITIONS

The term "polyolefin" is used herein in its stricter sense to mean a thermoplastic polymer derived from simple olefins. Among these are polyethylene, polypropylene and copolymers thereof with olefinic comonomers. For example, very low density polyethylene may be considered a linear ethylene copolymer with a comonomer comprising such materials as butene, hexene or octene. The term "polyolefin" is also used herein in a broader sense to include copolymers of ethylene with comonomers that are not themselves olefins, such as vinyl acetate (e.g. ethylene vinyl acetate copolymer or EVA).

The term "very low density polyethylene", or "VLDPE" is used herein to describe linear ethylene alpha-olefin copolymer (flexomer) having densities of generally between about 0.880 and 0.915 grams/cubic centimeter, and produced by a catalytic, low pressure process. "Ultra low density polyethylene" is also included in this term.

The term "ethylene vinyl acetate copolymer" (EVA) as used herein refers to a copolymer formed from ethylene and vinyl acetate monomers wherein the ethylene derived units are present in major amounts and the vinyl acetate derived units are present in minor amounts, generally one to 30 percent by weight.

The terms "melt flow" and "melt index" are used herein to mean the amount, in grams, of a thermoplastic resin which is forced through an orifice of specified length and diameter in ten minutes under prescribed conditions in accordance with ASTM D 1238.

The term "flow rate ratio" (FRR) is used to mean a dimensionless number derived by dividing the flow rate (melt flow or melt index) at one Condition with the flow rate at another Condition (ASTM D 1238). FRR is indicative of molecular weight distribution. The higher the FRR, the broader the molecular weight distribution.

BRIEF DESCRIPTION OF THE DRAWINGS

The invention may be further understood by reference to the drawings herein, where.

DESCRIPTION OF THE PREFERRED EMBODIMENTS

Figure 1:
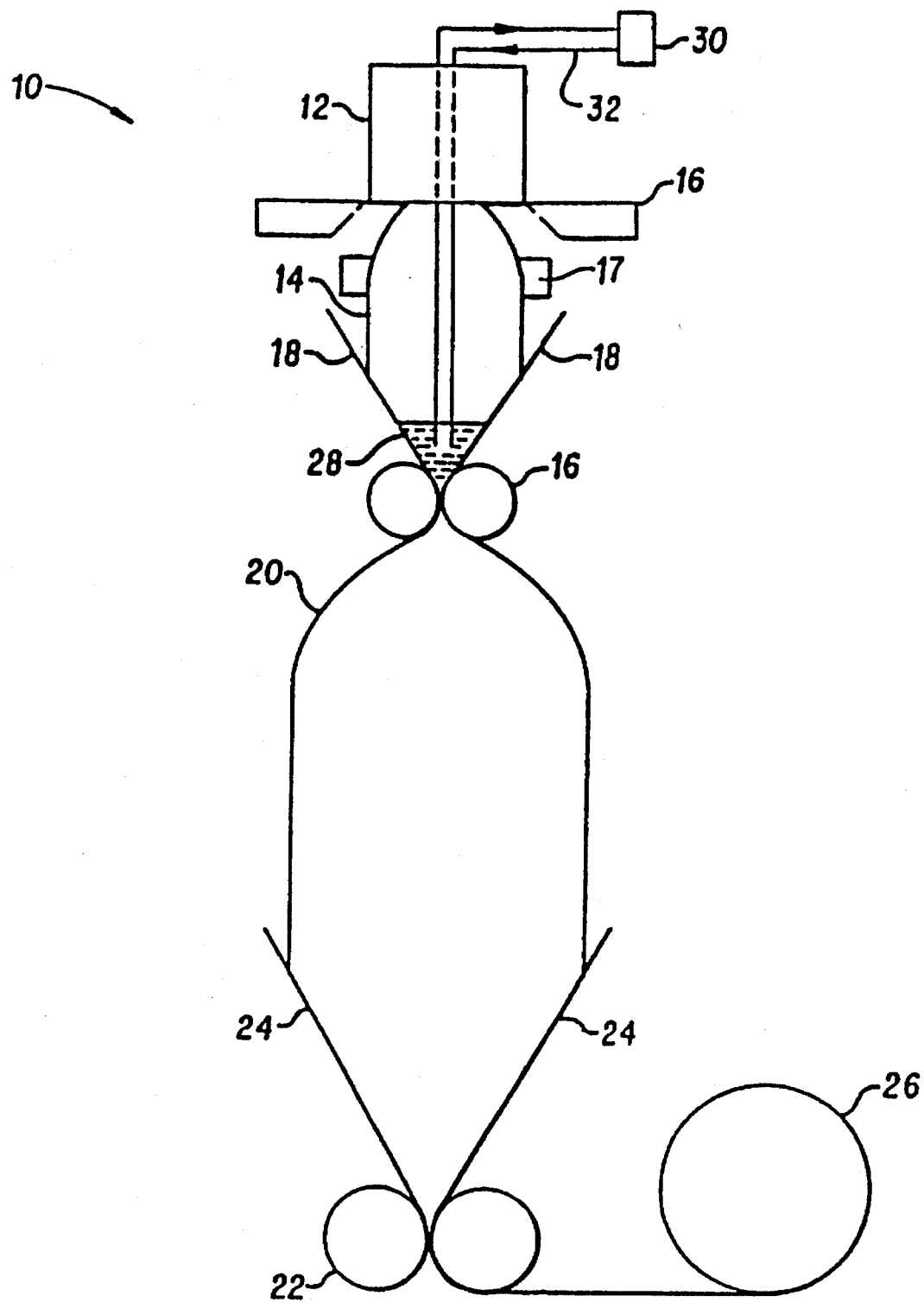
FIG. 1 is a schematic diagram indicating the apparatus and process by which the film of the present invention is made.

FIG. 1 shows schematically a device 10 for making the thin films of the present invention.

A melt stream of a polymeric material, preferably a material such as VLDPE is extruded through an extruder (not shown) and exits through a die 12 in a conventional manner. The extruded film is hot blown by conventional techniques to form a blown bubble 14.

Air cooling ring 16 positioned circumferentially around the blown bubble at the position shown cools the thermoplastic melt as it exits die 12.

An optional auxiliary chilling ring 17 may also be positioned circumferentially around the blown bubble down stream from air cooling ring 16 to further chill the hot blown film.

The primary bubble 14 is melt oriented in both the machine and transverse directions. Various blow up ratios may be used, but preferably the primary bubble 14 is hot blown to a blow up ratio of between 1.5 and 3.0.

The primary bubble 14 is collapsed at pinch rolls 16.

To assist in this process, guide plates 18 are positioned at the extremities of the blown bubble 14.

The collapsed bubble is then reinflated in a blown bubble process to stretch orient the blown and collapsed film. This is done in a conventional manner by trapping air or other hot gas within the secondary bubble 20 so that the material stretches at its orientation temperature transversely to impart further orientation of the material in the transverse direction. The secondary bubble 20 is collapsed at a second set of pinch rolls 22. A second set of guide plates 24 may be employed to assist in the collapsing process.

The second set of pinch rolls 22 is rotated at a speed faster than the first set of pinch rolls 16 to impart stretch orientation in the machine or longitudinal direction to the thermoplastic material.

The recollapsed bubble 20 then passes from the second set of pinch rolls 22 to take up roll 26.

The take up roll 26 may be a mill log which can be immediately stored or shipped to a distributor or customer, or may be stored for further processing such as slitting into single wound film, machine or natural center fold film. Thus, as used herein the take up roll 26 represents any further processing, storage, or further modification of the double wound, collapsed film once it exits the second set of pinch rolls 22, and is used herein to denote any of these possible further processing steps.

When using very low density polyethylene, it was noticed that some thickened edges of the film resulted from this process. To correct this deficiency, it is preferred that a reservoir 28 of heated fluid be disposed at the lower end of primary bubble 14 in such a way that the collapsing material drawn through the primary set of pinch rolls 16 will pass in communication with the heated fluid. In this manner, the film is more uniformly heated and temperature control can be achieved. Thickened tape edges can be substantially avoided by such means.

Although the heated fluid of reservoir 28 is preferably hot water, other media may be used if temperatures above the 212° F. limit of hot water are desired. For example propylene glycol (a food approved material), hot oil or hot emulsions may be used. One skilled in the art will understand that the exact nature of the heated fluid is not as critical as its effectiveness in helping to uniformly heat the collapsing bubble 14 as it is drawn through pinch rolls 16, and to uniformly heat the collapsing bubble 14 to a temperature above its orientation temperature.

The heated fluid may also be an "active" substance which not only reheats the surrounding film, but also actually coats the interior of the bubble as it passes over the reservoir. An example is a hot wax or other functional coating.

The heated fluid may be recirculated from the reservoir through a heating means 30 by means of conduits 32 or other suitable transfer means. Using the reservoir 28 of heated fluid, the types of materials which may be effectively used in the present process and device are increased. These materials fall generally into three classes.

The first class consists of crystalline polymers which can be quenched to the amorphous state by either air or an external cooling mandrel of the types depicted schematically at 16 and 17 of FIG. 1. Examples of such materials are polyethylene terephthalate, saran, and polypropylene. In the case of polyethylene terephthalate and saran, hot water is a suitable liquid medium for use in reservoir 28. In the case of polypropylene, a higher temperature liquid medium is preferred.

A second class of materials suitable for the present process are amorphous polymers such as polyethylene terephthalate glycol (PETG), polystyrene, and polycarbonate. In the case of PETG, hot water is a suitable liquid medium for reservoir 28. Higher temperature liquid media are preferred for polystyrene and polycarbonate.

A third class of materials which can be used with the present process are crystalline polymers which are not quenched amorphous by using air or external mandrel means. An example is high density polyethylene. In this case, a temperature of at least about 240° F. for the medium of reservoir 28 is required to melt out most of the crystalline structure of HDPE material.

Other materials, falling into one or more of these three classes, can also be used in the present process. These include polyamide (nylon), ethylene vinyl alcohol copolymer, and polyvinyl chloride. Copolymers and blends of any of these materials can also be used.

A major advantage of this process and device of the present invention is that a variety of polyolefinic materials may be made into relatively thin, oriented, tough materials suitable for packaging applications such as in store tray overwrap. Film gauges of less than 1 mil, and preferably less than 0.6 mils, even more preferably less than 0.5 mils and as low as 0.2 mils or less are obtainable. Even films with thicknesses as low as 0.1 mils or lower can be made by the practice of the present invention.

Although monolayer films are preferred, and particularly materials such as very low density polyethylene, multilayer films may also be produced. This is both technically possible and also sometimes desirable depending on the nature of the monolayer film. For example, a VLDPE available from Union Carbide and sold under the designation DFDA 1138 is a desirable material from a performance point of view. However, where materials have not yet attained food contact status, outer layers of a food approved material such as EVA may be used to "sandwich" the VLDPE or other core material. When more than one layer is to be used, coextrusion techniques commonly available in the art may be employed.

The invention may be further understood by reference to the following examples.

Example. 1

A central melt stream of very low density polyethylene (DFDA 1138 available from Union Carbide) and outside melt streams of an EVA (Elvax 3130 available from du Pont) were coextruded through a coextrusion die and hot blown to a blow up ratio of 1.78. The hot blown film had a thickness of 2 mils. The hot blown film was collapsed at a first set of pinch rolls and then inflated between the first set of pinch rolls and a second set of pinch rolls. The secondary bubble did not impart any substantial transverse orientation to the film material. The machine direction orientation was increased by speeding up the second set of pinch rolls relative to the first set of pinch rolls. The speed of the first set of pinch rolls was 36 feet per minute. The speed of the second set of pinch rolls was 180 feet per minute. The result was a stable bubble with no transverse expansion and 5:1 machine direction expansion to produce a final film with a thickness of 0.4 mils.

Example 2

A film was produced substantially like that of Example 1, with the same conditions for the primary bubble (hot blown film). The secondary bubble was inflated from 28 inch lay flat width to 46 inch lay flat width with transverse expansion of 1.64:1.

The speed of the second set of pinch rolls was 108 feet per minute to effect a machine direction expansion of the secondary bubble of 3:1. The film collected had cold thick edges because of lack of temperature control, but the center had a gauge thickness of 0.20 mils.

Example 3

The 0.20 mil film of Example 2 was used to package cut beef in a foam tray. The film exhibited strength and stretch characteristics approaching the characteristics of 0.60 mil stretch PVC. Hot wire cutting was similar to the PVC, but sealing required a heat-cool cycle to prevent the tabs from shrinking.

Packages made with the film of Example 2 exhibited more elastic recovery than PVC when poked with the finger.

It should be noted that when the heated hot blown film is collapsed through nip roll 16 and expanded into secondary bubble 20, the film can be either monoaxially or biaxially stretched. Stretching in the machine direction can be from ratios of 1:1 to 9:1. In the transverse direction, stretching ratios may range from 1:1 to 5:1. Any combination of ranges within those just described is possible. For example, the film may be essentially unstretched in the machine direction (1:1) and biaxially stretched at a 3:1 ratio in the transverse direction. The reverse is also true.

Additionally, the degree of transverse direction or machine direction stretching in secondary bubble 20 is substantially independent of the blow ratio in primary bubble 14, so that many combinations of blow up ratios in the primary and secondary bubble are achievable. However, more stress (higher bubble pressure) occurs in the secondary bubble if the blow ratio in the primary bubble is reduced. Therefore, higher blow up ratios in the primary bubble will make it easier to orient a given material in the secondary bubble.

Several additional films were also produced by substantially the same process as described in Examples 1 and 2.

A liquid reservoir or "sock" containing heated water, located at the lower interior portion of the hot blown primary bubble (see reference numeral 28 of FIG. 1) was used to control the temperature of the hot blown film prior to re-inflation into the second bubble. More specifically, the heated water was maintained at temperatures between 183° F. and 204° F. to raise the temperature of the hot blown film to above its orientation temperature.

It has been found that the liquid reservoir not only brings the temperature of the hot blown film up to its orientation temperature, but also equilibrates the temperature of the film around the circumference of the bubble. This in turn provides for better control of the final film gauge, and in particular reduces the incidence of thickened edges in the final film.

In Table 2, a list of the film structures produced, and the blow up ratios in the primary and secondary bubble are listed. The thickness of the final film, and temperature of the heated water inside the reservoir are also listed.

Table 1 describes materials utilized in Examples 3–17:

TABLE 1

| RESIN | COMMERCIAL NAME | DESCRIPTION | COMPANY |
|---|---|---|---|
| EVA$_1$ | ELVAX 3130 | EVA12% VA MELT INDEX = 2.5 grams/ 10 min. | DU PONT |
| EVA$_2$ | 32.89 | EVA4% VA MELT INDEX = 10 grams/ 10 min. | EXXON |
| EVA$_3$ | 9653 | EVA12% VA (including antifog additive) | DU PONT |
| VLDPE$_1$ | DFDA 1138 | .900 grams/cc MELT INDEX = 0.4 grams/ 10 min. | UNION CARBIDE |
| VLDPE$_2$ | 1121 | DENSITY = .900 grams/cc MELT INDEX = 0.4 grams/ 10 min. (ANTIFOG VERSION OF DFDA 1138) | UNION CARBIDE |
| VLDPE$_3$ | 4003 | DENSITY = .905 grams/cc MELT INDEX = .8 grams/10 min. | DOW |
| VLDPE$_4$ | XUR 1567 41225-18K | DENSITY = .900 grams/cc MELT INDEX = .8 grams/10 min. | DOW |
| VLDPE$_5$ | DEFD 1491 | DENSITY = .900 grams/cc MELT INDEX = 1.0 grams/10 min. | UNION CARBIDE |

TABLE 2

| EXAMPLE | FILM STRUCTURE | PRIMARY | SECONDARY T | SECONDARY L | THICKNESS (MILS) | SOCK TEMP (°F.) |
|---|---|---|---|---|---|---|
| 4 | EVA$_1$/VLDPE$_1$/EVA$_1$ | 1.7:1 | 3:1 | 3.8:1 | .25 | 183 |
| 5 | EVA$_1$/VLDPE$_1$/EVA$_1$ (1/2 RATE)[1] | 1.7:1 | 3:1 | 3.8:1 | .12 | 183 |
| 6 | EVA$_1$/VLDPE$_1$/EVA$_1$ | 2.5:1 | 2.1:1 | 3.9:1 | .30 | 184 |
| 7 | EVA$_2$/VLDPE$_1$/EVA$_2$ (LOWER SKIN RATES) | 2.5:1 | 2.1:1 | 3.9:1 | .30 | 204 |
| 8 | 50% EVA$_3$/VLDPE$_1$/50% EVA$_3$ + +50% EVA$_1$/ /50% EVA$_1$ | 2.5:1 | 2.1:1 | 3.9:1 | .30 | 184 |
| 9 | 50% EVA$_3$/VLDPE$_1$/50% EVA$_3$ + +50% EVA$_1$/ /50% EVA$_1$ | 2.0:1 | 2.6:1 | 3.4:1 | .30 | 184 |
| 10 | 50% EVA$_3$/VLDPE$_1$/50% EVA$_3$ + +50% EVA$_1$/ /50% EVA$_1$ | 1.9:1 | 2.8:1 | 3.0:1 | .30 | 190 |
| 11 | 50% EVA$_3$/VLDPE$_1$/50% EVA$_3$ + (LOWER RATE)[2] +50% EVA$_1$/ /50% EVA$_1$ | 1.9:1 | 2.8:1 | 3.0:1 | .18 | 190 |
| 12 | 50% EVA$_3$/VLDPE$_2$/VLDPE$_1$/VLDPE$_2$/50% EVA$_3$ + +50% EVA$_1$/ /50% EVA$_1$ | 1.9:1 | 2.8:1 | 3.0:1 | .30 | 195 |
| 13 | 50% EVA$_3$/VLDPE$_1$/50% EVA$_3$ + +50% EVA$_1$/ /50% EVA$_1$ | 1.9:1 | 3.0:1 | 3.0:1 | .30 | 195 |
| 14 | 50% EVA$_3$/VLDPE$_1$/50% EVA$_3$ + (FASTER DRAW)[3] +50% EVA$_1$/ /50% EVA$_1$ | 1.9:1 | 3.0:1 | 3.1:1 | .18 | 195 |
| 15 | EVA$_1$/VLDPE$_3$/EVA$_1$ | 2.1:1 | 2.7:1 | 3.0:1 | .25 | 195 |
| 16 | 50% EVA$_3$/VLDPE$_4$/50% EVA$_3$ + +50% EVA$_1$/ /50% EVA$_1$ | 1.9:1 | 2.7:1 | 2.8:1 | .30 | 195 |
| 17 | EVA$_1$/VLDPE$_5$/EVA$_1$ | 1.9:1 | 3.0:1 | 3.0:1 | .25 | 195 |

[1]All extruders were reduced to on half the rate of the extruders of Example 4, i.e. 41 rpm for Example 5.
[2]All extruders were reduced to 60% of the rate of the extruders of Example 4, i.e. 50 rpm for Example 11.
[3]The take-off speed of the film was 59% faster than that of Example 4, i.e. 200 feet/min. for Example 14.

[1]All extruders were reduced to one half the rate of the extruders of Example 4, i.e. 41 rpm for Example 5.

[2]All extruders were reduced to 60% of the rate of the extruders of Example 4, i.e. 50 rpm for Example 11.

[3]The take-off speed of the film was 59% faster than that of Example 4, i.e. 200 feet/min. for Example 14.

In Table 4, a list of other film structures produced, and the blow up ratios in the primary and secondary bubble are listed. The thickness of the final film, and temperature of the heated water inside the reservoir are also listed.

Table 3 describes materials utilized in Examples 18–50. Other materials used in Examples 18–50 are listed and described in Table 1.

TABLE 3

| RESIN | COMMERCIAL NAME | DESCRIPTION | COMPANY |
|---|---|---|---|
| EVA$_4$ | ELVAX 3165 | EVA18% VA MELT INDEX = .7 grams/10 min. | DU PONT |
| EVA$_5$ | ELVAX 3170 | EVA18% VA MELT INDEX = 2.5 grams/10 min. | DUPONT |
| EVA$_6$ | ELVAX 3182 | EVA28% VA MELT INDEX = 3.0 grams/10 min. | DU PONT |
| EVA$_7$ | ELVAX 3508 | EVA12% VA MELT INDEX = .3 grams/10 min. | DUPONT |
| EAA$_1$ | PRIMACORE 1410 | EAA9.5% AA | DOW |
| VLDPE$_6$ | FW 1990 | DENSITY = .900 grams/cc MELT INDEX = .8 grams/10 min. | NORSOLOR |

TABLE 3-continued

| RESIN | COMMERCIAL NAME | DESCRIPTION | COMPANY |
|---|---|---|---|
| VLDPE$_7$ | 30S | DENSITY = .901 grams/cc MELT INDEX = .8 GRAMS/10 min. | DOW |
| VLDPE$_8$ | 30R | DENSITY = .902 grams/cc MELT INDEX = .6 grams/10 min. | DOW |
| VLDPE$_9$ | 30Q | DENSITY = .895 grams/cc MELT INDEX = .42 grams/10 min. | DOW |

TABLE 4

| EXAMPLE | FILM STRUCTURE | PRIMARY | SECONDARY T | SECONDARY L | THICKNESS (MILS) | SOCK TEMP (°F.) |
|---|---|---|---|---|---|---|
| 18 | 50% $EVA_3$/$VLDPE_5$/50% $EVA_3$[4] +50% $EVA_1$/ /+50% $EVA_1$ | 2.1:1 | 2.7:1 | 3:1 | .3 | 195 |
| 19 | 50% $EVA_3$/$VLDPE_5$/50% $EVA_3$[5] +50% $EVA_4$/ /+50% $EVA_4$ | 2.1:1 | 2.7:1 | 3:1 | .3 | 195 |
| 20 | 25% $EVA_3$/$VLDPE_5$/25% $EVA_3$[6] +75% $EVA_1$/ /+75% $EVA_1$ | 2.1:1 | 2.7:1 | 3:1 | .3 | 195 |
| 21 | 50% $EVA_3$/$VLDPE_5$/50% $EVA_3$ +50% $VLDPE_5$/ /+50% $VLDPE_5$[7] | 2.1:1 | 2.7:1 | 3:1 | .3 | 195 |
| 22 | $EVA_1$/$VLDPE_1$/$EVA_1$ | 2.1:1 | 2.7:1 | 2.3:1 | .25 | 195 |
| 23 | $EVA_1$/$VLDPE_1$/$EVA_1$[8] | 2.9:1 | 0 | 3:1 | 195 | |
| 24 | 25% $EVA_3$/$VLDPE_1$/25% $EVA_3$[9] +75% $EVA_1$/ /+75% $EVA_1$ | 2.5:1 | 2.3:1 | 2:1 | .50 | 195 |
| 25 | 25% $EVA_3$/$VLDPE_1$/25% $EVA_3$[10] +75% $EVA_1$/ /+75% $EVA_1$ | 2.5:1 | 2.3:1 | 2:1 | .50 | 195 |
| 26 | 25% $EVA_3$/$VLDPE_1$/25% $EVA_3$[11] +75% $EVA_1$/ /+75% $EVA_1$ | 1.9:1 | 3:1 | 2:1 | .4 | 195 |
| 27 | 25% $EVA_3$/$VLDPE_1$/25% $EVA_3$[12] +75% $EVA_1$/ /+75% $EVA_1$ | 1.9:1 | 3:1 | 2:1 | .4 | 195 |
| 28 | 25% $EVA_3$/$VLDPE_1$/25% $EVA_3$[13] +75% $EVA_1$/ /+75% $EVA_1$ | 1.9:1 2.2:1 | 3:1 | 2:1 | .4 | 195 |
| 29 | 25% $EVA_3$/$VLDPE_1$/25% $EVA_3$ +75% $EVA_1$/ /+75% $EVA_1$ | 2.2:1 | 3:1 | 2:1 | .25 | 195 |
| 30 | 25% $EVA_3$/$VLDPE_1$/25% $EVA_3$[14] +75% $EVA_5$/ /+75% $EVA_5$ | 1.9:1 | 3:1 | 2:1 | .5 | 195 |
| 31 | 25% $EVA_3$/$VLDPE_1$/25% $EVA_3$[15] +75% $EVA_5$/ /+75% $EVA_5$ | 1.9:1 | 3.1 | 2:1 | .25 | 195 |
| 32 | 25% $EVA_3$/$VLDPE_1$/25% $EVA_3$[16] +75% $EVA_6$/ /+75% $EVA_6$ | 1.9:1 | 3:1 | 2:1 | .50 | 181 |
| 33 | 25% $EVA_3$/$VLDPE_1$/25% $EVA_3$[17] +75% $EAA_1$/ /+75% $EAA_1$ | 1.9:1 | 3:1 | 2:1 | .5 | 195 |
| 34 | $EVA_1$/$VLDPE_1$/$EVA_1$[18] | 1.9:1 | 3:1 | 2:1 | 1.0 | 195 |
| 35 | $EVA_1$/$VLDPE_1$/$EVA_1$[19] | 2.2:1 | 1.5:1 | 1:1 | | 195 |
| 36 | $EVA_1$/$VLDPE_1$/$EVA_1$[20] | 2.1:1 | 2.1:1 | 1:1 | | 195 |
| 37 | $EVA_7$/$VLDPE_5$/$EVA_7$[21] | 3:1 | | | | |
| 38 | $EVA_1$/$VLDPE_6$/$EVA_1$[22] | 2.4:1 | 2.3:1 | 2:1 | .5 | 193 |
| 39 | $EVA_1$/$VLDPE_6$/$EVA_1$[23] | 2.4:1 | 2.3:1 | 2:1 | .25 | 193 |
| 40 | $EVA_1$/$VLDPE_7$/$EVA_1$ | 2.1:1 | 2.7:1 | 2:1 | .5 | 195 |
| 41 | $EVA_1$/$VLDPE_7$/$EVA_1$[24] | 2.1:1 | 2.7:1 | 2:1 | .25 | 195 |
| 42 | 25% $EVA_3$/$VLDPE_8$/25% $EVA_3$[25] +75% $EVA_1$/ /+75% $EVA_1$ | 2.0:1 | 2.8:1 | 2:1 | .25 | 195 |
| 43 | 25% $EVA_3$/$VLDPE_8$/25% $EVA_3$[26] +75% $EVA_1$/ /+75% $EVA_1$ | 2.9:1 | 1.9:1 | 2:1 | .25 | 195 |
| 44 | 25% $EVA_3$/$VLDPE_9$/25% $EVA_3$[27] +75% $EVA_1$/ /+75% $EVA_1$ | 2.0:1 | 2.8:1 | 2:1 | .25 | 195 |
| 45 | $VLDPE_1$[28] | 2.0:1 | 2.7:1 | 2:1 | .50 | 195 |
| 46 | 25% $EVA_3$/$VLDPE_1$/25% $EVA_3$[29] +75% $EVA_7$/ /+75% $EVA_7$ | 1.9:1 | 3:1 | 2:1 | .25 | 195 |
| 47 | 25% $EVA_3$/$VLDPE_1$/25% $EVA_3$[30] +75% $EVA_1$/ /+75% $EVA_1$ | 1.9:1 | 2.9:1 | 2:1 | .25 | 195 |
| 48 | 25% $EVA_3$/$VLDPE_1$/25% $EVA_3$[31] +75% $EVA_1$/ /+75% $EVA_1$ | 1.9:1 | 2.9:1 | 3:1 | .25 | 193 |
| 49 | 25% $EVA_3$/$VLDPE_1$/25% $EVA_3$[32] +75% $EVA_1$/ /+75% $EVA_1$ | 2.3:1 | 2.5:1 | 2.5:1 | .25 | 193 |
| 50 | 25% $EVA_3$/$VLDPE_1$/25% $EVA_3$[33] +75% $EVA_1$/ /+75% $EVA_1$ | 1.9:1 | 2.9:1 | 3:1 | .25 | 193 |

Notes to Table 4
[4]Die slough problem (new air ring) die gap .110".
[5]Reduced die slough. Couldn't maintain bubble.
[6]No die slough, bubble life 15 min.
[7]Mottled coex. Secondary bubble life short.
[8]L. O. film.
[9]Reduced die gap from .110 to .075 2 hr. bubble. Couldn't make .25 mil.
[10]Changed die gap to .040". Primary bubble temp. from die to sock 300, 173, 160, 186-Still unstable orientation. Changed to Johnson air ring.
[11]Die gap = .075". Primary bubble temp. from die to sock 279, 188, 138, 191. Secondary bubble gauge = .2–.6.
[12]Adjusted Gauge:
Secondary: .35–.5
Primary: .16–.27
Primary bubble gauge off-balanced to achieve better gauge. Probably due to skin layer thickness variations orienting differently.
[13]Turned off chiller causing primary bubble to widen.
[14]Chilled air-Johnson air ring.
[15]Some incompatibility haze but ran well fewer gels causing bubble breaks.
[16]Serious incompatability.
[17]Hard to process.

TABLE 4-continued

| EXAMPLE | FILM STRUCTURE | PRIMARY | SECONDARY | | THICKNESS (MILS) | SOCK TEMP (°F.) |
|---|---|---|---|---|---|---|
| | | | T | L | | |

[18]Made for low cost forming web.
[19]Transverse orientation.
[20]Transverse maximum (obstruction limited).
[21]Could not maintain bubble because of apparent excess primary orientation, hot blown instead.
[22]Amorphous clear primary bubble.
[23]Primary bubble pulsed. Switched core to (LW2550). Primary melt was too weak to make film.
[24]Primary bubble too weak.
[25]Stable bubble.
[26]More stable than 41.
[27]Very stable (gels might have been due to EVA)
[28]Stable orientation, hazy film.
[29]Progressed to hazy weak film. Melt became cheesy. Suspected X-linking in die or extruder.
[30].1% Irganox 1010 added to skins.
[31]Increased L. O.
[32]Lower transverse & L. O. ratio.
[33]Increased die from 350 to 375° F. Conclusion: Irganox 1010 reduced X-linking of skin layers.

In Table 6, a list of additional film structures produced, and a blow up ratio in the primary and secondary bubble are listed. The thickness of the final film, and temperature of the heated water inside the reservoir are also listed.

Table 5 describes materials utilized in Examples 51 through 76. Other materials used in Examples 51 through 76 are listed and described in Tables 1 and 3.

TABLE 5

| RESIN | COMMERCIAL NAME | DESCRIPTION | COMPANY |
|---|---|---|---|
| $VLDPE_{10}$ | TAFMER 0680 | DENSITY = .88 grams/cc MELT INDEX = .4 grams 10 min. | MITSUI |
| $VLDPE_{11}$ | DEFD 1064 NT 7 | DENSITY = .912 grams/cc MELT INDEX = 1.0 grams 10 min. | UNION CARBIDE |
| $VLDPE_{12}$ | 1210 | DENSITY = .89 grams/cc Narrow Molecular Weight Distribution MELT INDEX = 1 gram/ 10 min. | UNION CARBIDE |
| $VLDPE_{13}$ | 61509.32 | DENSITY = .911 grams/cc MELT INDEX = .55 grams/ 10 min. | DOW |
| $SBC_1$ | KR-10 | STYRENE BUTADIENE COPOLYMER DENSITY = 1.01 grams/cc MELT INDEX = 8 grams 10 min. | PHILLIPS |

TABLE 6

| EXAMPLE | FILM STRUCTURE | PRIMARY | SECONDARY | | THICKNESS (MILS) | SOCK TEMP (°F.) |
|---|---|---|---|---|---|---|
| | | | T | L | | |
| 51 | 50% $EVA_1$/$VLDPE_5$/50% $EVA_1$[34] +50% $EVA_3$/ /+50% $EVA_3$ | | | | | |
| 52 | 50% $EVA_1$/$EVA_7$/50% $EVA_1$[35] +50% $EVA_3$/ /+50% $EVA_3$ | | | | | |
| 53 | 50% $EVA_1$/$VLDPE_3$/50% $EVA_1$[36] +50% $EVA_3$/ /+50% $EVA_3$ | | | | | |
| 54 | 50% $EVA_7$/$VLDPE_3$/50% $EVA_7$[37] +50% $EVA_3$/ /+50% $EVA_3$ | | | | | |
| 55 | 50% $EVA_7$/80% $VLDPE_5$/50% $EVA_7$[38] | 2.1:1 | 2.70:1 | 2.85:1 | | 195 |

TABLE 6-continued

| EXAMPLE | FILM STRUCTURE | PRIMARY | SECONDARY T | SECONDARY L | THICKNESS (MILS) | SOCK TEMP (°F.) |
|---|---|---|---|---|---|---|
| 56 | 50% EVA$_1$/80% VLDPE$_5$/50% EVA$_1$[39] +50% EVA$_3$/+20% VLDPE$_3$/+50% EVA$_3$ | 2.1:1 | 2.70:1 | 2.85:1 | | 195 |
| 57 | 50% EVA$_7$/80% VLDPE$_3$/50% EVA$_7$[40] +50% EVA$_3$/+20% VLDPE$_{10}$/+50% EVA$_3$ | 2.1:1 | 2.75:1 | 2.83:1 | | 195 |
| 58 | 50% EVA$_7$/65% VLDPE$_5$/50% EVA$_7$[41] +50% EVA$_3$/35% VLDPE$_3$/+50% EVA$_3$ | 2.10:1 | 2.7:1 | 2.85:1 | | 195 |
| 59 | 50% EVA$_1$/65% VLDPE$_{11}$/50% EVA$_1$[42] +50% EVA$_3$/35% VLDPE$_{12}$/+50% EVA$_3$ | 2.23:1 | 2.67:1 | 2.88:1 | .20 | 211 |
| 60 | 50% EVA$_1$/65% VLDPE$_{11}$/50% EVA$_1$[43] +50% EVA$_3$/35% VLDPE$_{12}$/+50% EVA$_3$ | 2.55:1 | 1.00:1 | 3.00:1 | .70 | 211 |
| 61 | 50% EVA$_1$/VLDPE$_{11}$/50% EVA$_1$[44] +50% EVA$_3$/ /+50% EVA$_3$ | 2.23:1 | 2.67:1 | 2.88:1 | | 211 |
| 62 | VLDPE$_{11}$/VLDPE$_{11}$/VLDPE$_{11}$[45] | 2.33:1 | 1.00:1 | 3.00:1 | 1.50 | 200 |
| 63 | VLDPE$_{11}$/VLDPE$_{11}$/VPDPE$_{11}$ | 3.29:1 | 1.90:1 | 3.43:1 | | 210 |
| 64 | 50% EVA$_1$/VLDPE$_{11}$/50% EVA$_1$ +50% EVA$_3$/ /+50% EVA$_3$ | 3.29:1 | 1.90:1 | 3.00:1 | | 209 |
| 65 | 50% EVA$_1$/VLDPE$_{11}$/50% EVA$_1$[46] +50% EVA$_3$/ /+50% EVA$_3$ | 2.23:1 | 2.67:1 | 2.88:1 | | 211 |
| 66 | 50% EVA$_1$/VLDPE$_{11}$/50% EVA$_1$ +50% EVA$_3$/ /+50% EVA$_3$ | 2.23:1 | 2.67:1 | 3.00:1 | .20 | 211 |
| 67 | 50% EVA$_1$/65% VLDPE$_{11}$/50% EVA$_1$ +50% EVA$_3$/+35% EVA$_4$/+50% EVA$_3$ | 2.33:1 | 2.5:1 | 2.65:1 | .40 | 207 |
| 68 | 50% EVA$_1$/VLDPE$_{13}$/50% EVA$_1$ +50% EVA$_3$/ /+50% EVA$_3$ | 2.12:1 | 2.90:1 | 3.00:1 | .25 | 209 |
| 69 | 50% EVA$_1$/VLDPE$_{13}$/50% EVA$_1$ +50% EVA$_3$/ /+50% EVA$_3$ | 1.60:1 | 3.73:1 | 3.00:1 | .20 | 209 |
| 70 | 50% EVA$_1$/VLDPE$_1$/50% EVA$_1$ +50% EVA$_3$/ /+50% EVA$_3$ | 2.12:1 | 3.00:1 | 3.00:1 | .20 | 205 |
| 71 | EVA$_5$/VLDPE$_1$/EVA$_5$[47] | 2.12:1 | 3.00:1 | 3.00:1 | .20 | 205 |
| 72 | EVA$_4$/VLDPE$_1$/EVA$_4$[48] | 2.02:1 | 3.05:1 | 3.00:1 | .20 | |
| 73 | EVA$_4$/80% VLDPE$_{13}$/EVA$_4$[49] +20% VLDPE$_{10}$ | 2.02:1 | 2.90:1 | 3.00:1 | .20 | 211 |
| 74 | 50% EVA$_1$/80% VLDPE$_{13}$/50% EVA$_1$[50] +50% EVA$_3$/+20% VLDPE$_{10}$/+50% EVA$_3$ | 2.02:1 | 2.90:1 | 3.00:1 | .20 | 211 |
| 75 | EVA$_4$/80% VLDPE$_{13}$/EVA$_4$[51] /+20% EVA$_4$ | 2.02:1 | 2.90:1 | 3.00:1 | .20 | 211 |
| 76 | SBC$_1$/EVA$_6$/80% VLDPE$_{13}$/EVA$_6$/SBC$_1$[52] /+20% EVA$_4$ | 2.97:1 | 1.00:1 | 2.50:1 | 1.00 | 210 |

Notes For Table 6
[34] Primary bubble too weak.
[35] Better primary bubble strength but secondary was unstable.
[36] Could not maintain secondary bubble.
[37] Better primary stability but secondary still unstable.
[38] Slightly hazy film with 20 min. bubble life.
[39] Primary lost some stability secondary bubble life 20 min. better clarity.
[40] Up to 2 hr. bubble (blend approach promising).
[41] 2000 ft. run when pumps failed.
[42] Hazy film, hard to blow secondary but stable when blown.
[43] L. O. material.
[44] Easier to blow than Sample 5. Stable secondary but hazy film.
[45] L. O. material.
[46] Stable but hazy bubble.
[47] Lost feed on skin layers after a short time.
[48] 18% VA skin layers contributed to best stability yet.
[49] Best and most stable process yet. No cold stretch line as in 13 & 14. Very tough primary.
[50] Could only maintain 10 min. bubbles plus primary was not as tough.
[51] Became hazy due to EVA blend.
[52] Clear monax for label trials.

The inventor has found that materials with high molecular weight and wide molecular weight distribution are preferred for the core layer of multilayer film structures in accordance with the invention. These materials, particularly VLDPE, are also characterized by low crystallinity at processing temperatures.

Preferred VLDPE resins are characterized by high molecular weight (i.e. relatively low melt index), broad molecular weight distribution (i.e. relatively high flow rate ratio), and relatively low crystallinity at processing temperatures.

For the VLDPE, a melt index (MI) of no more than about 0.15 grams/ 10 minutes (ASTM D 1238) (Condition 190/2.16) is preferred. A more preferred MI is 0.12 grams/ 10 minutes.

Preferred VLDPE resins can also be characterized by a melt index of no more than about 0.50 grams/ 10 minutes, more preferably no more than about 0.45 grams/ 10 minutes (ASTM D 1238) (Condition 190/5.0); no more than about 1.50 grams/ 10 minutes, and more preferably no more than about 1.35 grams/ 10 minutes (ASTM D 1238) (Condition 190/10.); or no more than about 10 grams/ 10 minutes, and more preferably no more than about 6 grams/ 10 minutes (ASTM D 1238) (Condition 190/21.601).

For the VLDPE, a molecular weight distribution (flow rate ratio) of at least about 10 ($I_{21}/I_5$) (ASTM D 1238) is preferred. This value is derived by dividing the flow rate at Condition 190/21.6 by the flow rate at Condition 190/5.0. A more preferred FRR is 13.

Preferred VLDPE resins can also be characterized by a FFR of at least about 40, more preferably at least about 50 ($I_{21}/I_{2.1}$) (ASTM D 1238). This value is derived by dividing the flow rate at Condition 190/21.6 by the flow rate at Condition 190/2.16.

An especially preferred VLDPE is a high molecular weight resin such as DEFD 1015 from Union Carbide. This resin has a density of about 0.900 grams/cc, a melt flow rate of about 6 grams/ 10 minutes (ASTM D 1238, Condition 190/21.601), and a FFR ($I_{21}/I_{2.1}$) of about 50.

It has also been found that high vinyl acetate EVA resins i.e. 18% and higher, are preferred for use in the outer layers of multilayer films of the present invention. These higher vinyl acetate EVA resins provide a wider sealing range for the final film when used in in-store overwrap applications on conventional manual and automatic equipment.

Although the invention has been described with respect to specific embodiments, those skilled in the art will understand that suitable modifications and changes may be made without departing from the spirit and scope of the invention as defined below.

For example, the oriented film produced by the process of the present invention has a relatively high free shrink and shrink force. At 185° F., a typical free shrink value for the film of the present invention is 50%. In end-use applications where it is desirable to reduce the amount of free shrink or shrink force or shrink tension in the film, the material exiting the secondary bubble may be annealed or heat set by means of a tertiary bubble. This bubble may be characterized as one of intermediate pressure, compared with the relatively high pressure secondary bubble, and the relatively low pressure primary bubble.

Figure 2:
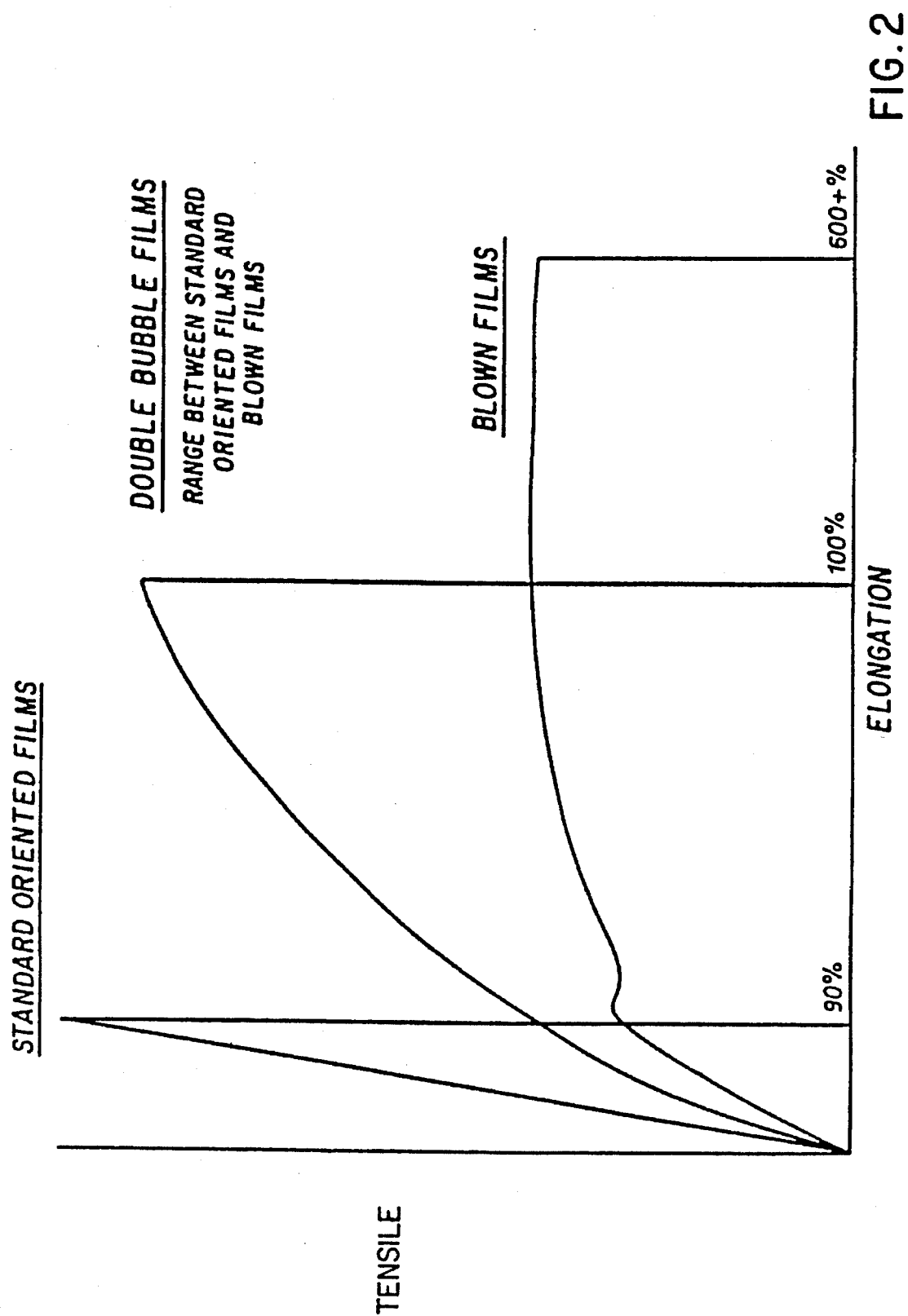
FIG. 2 is a graph showing the relationship between tensile force applied to a film, and elongation, for different types of films including the double bubble film of the present invention.

Films produced by the present double bubble process can be graphically characterized as shown in FIG. 2. Because of the nature of the process, a thin film is produced that has excellent "memory" combined with good elongation. This combination of properties compares favorably with conventionally oriented film, which has good memory but poor elongation properties. The present film also compares favorably with conventional hot blown films which exhibit good elongation but poor memory.

Films of the present invention can optionally be cross-linked. This can be done chemically or by the use of irradiation.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

What is claimed is:

1. A biaxially oriented packaging film having a thickness of less than about 0.3 mil comprising a layer of a polymeric material selected from the group consisting of:

a) very low density polyethylene, b) ethylene vinyl acetate copolymer, c) propylene polymer or copolymer, d) high density polyethylene, e) ethylene vinyl alcohol copolymer, f) mixtures of any of these materials.

2. The film of claim 1 wherein the very low density polyethylene has a melt index before blending of no more than about 10 grams/10 minutes (ASTM D1238) (Condition 190/21.601).

3. The film of claim 1 wherein the very low density polyethylene has a flow rate ratio ($I_{22}/I_{2.1}$) before blending of at least about 40 (ASTM D 1238).

4. The film of claim 1 wherein the film is cross-linked.

5. The film of claim 1 wherein the film has a thickness of less than about 0.20 mils.

6. The film of claim 1 wherein the film has a thickness of less than about 0.10 mils.

* * * * *